United States Patent [19]

Fogelberg et al.

[11] 4,047,601

[45] Sept. 13, 1977

[54] AUTOMATIC FOUR-WHEEL DRIVE TRANSFER CASE

[75] Inventors: Mark John Fogelberg; Donald William Kelbel, both of Muncie, Ind.

[73] Assignee: Borg-Warner Corporation, Chicago, Ill.

[21] Appl. No.: 691,672

[22] Filed: June 1, 1976

Related U.S. Application Data

[63] Continuation-in-part of Ser. No. 637,923, Dec. 5, 1975, abandoned.

[51] Int. Cl.² ............................................. F16D 41/10
[52] U.S. Cl. ............................... 192/36; 180/44 R; 192/44; 192/114 R
[58] Field of Search ............ 192/35, 36, 44, 114 R; 180/44 R, 49

[56] References Cited

U.S. PATENT DOCUMENTS

| | | | |
|---|---|---|---|
| 1,290,031 | 1/1919 | Adler | 192/50 |
| 2,699,852 | 1/1955 | Cost | 192/46 |
| 2,796,941 | 6/1957 | Hill | 180/44 |
| 3,221,574 | 12/1965 | Sampietro et al. | 74/665 |
| 3,283,611 | 11/1966 | Weismann et al. | 74/650 |
| 3,295,625 | 1/1967 | Ordorica et al. | 180/44 |
| 3,300,002 | 1/1967 | Roper | 192/35 |

FOREIGN PATENT DOCUMENTS 899,607  8/1944  France

*Primary Examiner*—Allan D. Hermann
*Attorney, Agent, or Firm*—Julian Schachner

[57] ABSTRACT

A power transfer mechanism incorporated in a multiple path drive system comprising a transfer case disposed between a source of input torque and a pair of drive axles. Torque is transferred directly to one drive axle and is transferred automatically to the other drive axle through a double-acting overrunning clutch when required. The clutch is biased toward one engaged position, and is prevented from locking inadvertently in the other engaged position by a direction-sensitive blocking device.

20 Claims, 8 Drawing Figures

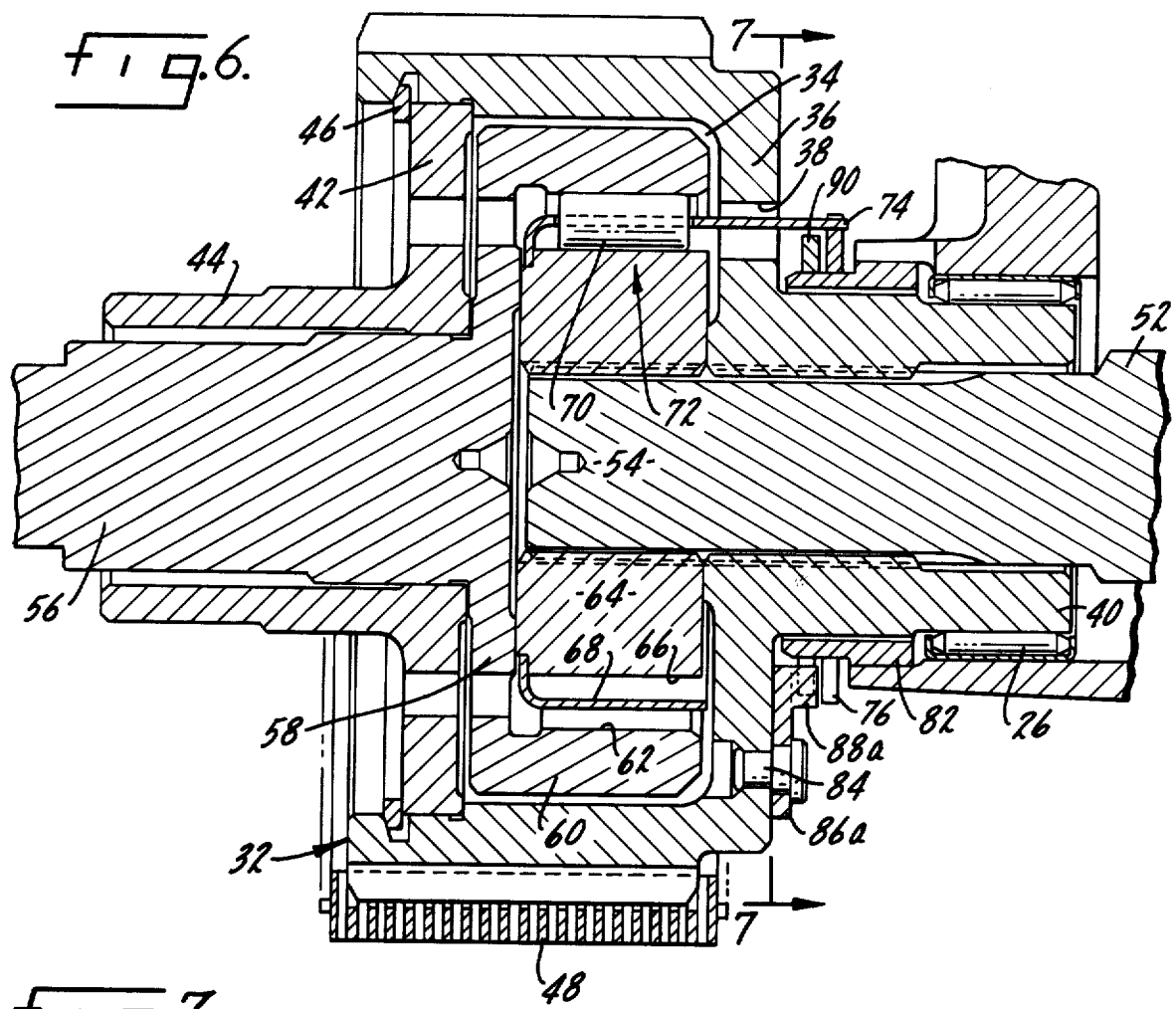
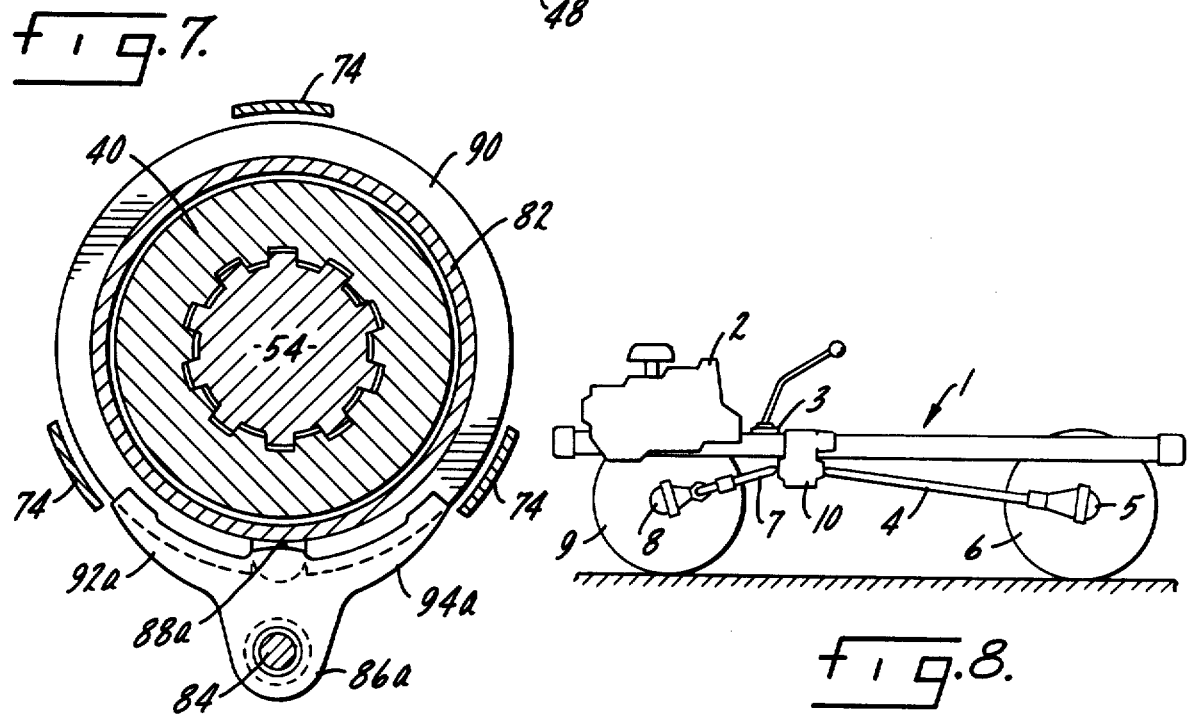

AUTOMATIC FOUR-WHEEL DRIVE TRANSFER CASE

CROSS-REFERENCE TO RELATED APPLICATION

This application is a continuation-in-part of U.S. application Ser. No. 637,923 filed Dec. 5, 1975, now abandoned.

BACKGROUND OF THE INVENTION

This invention relates generally to a power transfer mechanism adapted to be incorporated in a multiple path drive system, for example a four-wheel drive vehicle. More particularly, it relates to a torque transfer case adapted to receive torque from a prime mover and to provide torque for one drive axle where two-wheel drive is adequate, and to provide torque for both drive axles automatically where four-wheel drive is required. The torque transfer case incorporates a double-acting overrunning clutch responsive to relative rotation between the drive axles for automatically engaging where four-wheel drive is required.

In recent years there have been many improvements in automotive drive trains, including improvements relating to the transfer of torque from a prime mover to drive axles. Where four-wheel drive systems are used, transfer cases have been developed which generally provide torque transfer to one output to drive an axle and to another output for driving another axle. Some such transfer cases generally have included an overrunning mechanism which automatically engages and disengages the four-wheel drive function by biasing the cage of the mechanism to ground. It has been found that an excessive overrunning condition may cause undesirable lock-up of the overrunning mechanism, thus negating its automatic function. This problem has been partially solved by the use of a speed-responsive blocking structure as disclosed in U.S. Pat. application Ser. No. 615,001 filed Sept. 19, 1975. However, it is now known that an excessive overrunning condition may obtain at speeds below the threshold speed of such a structure. Thus, there remains a need to provide an improved torque transfer case which engages and disengages automatically, but which prevents undesirable engagement even at low speeds, while providing for smooth operation, low wear and equalization of load on the transfer mechanism.

Accordingly, it is an object of this invention to meet the continuing need and desire in the art for improvements in a torque transfer mechanism which normally provides torque transfer to one output shaft for establishing a two-wheel drive condition, and which automatically engages through an overrunning device to provide torque transfer to two output shafts for establishing a four-wheel drive condition. The overrunning device is biased toward engagement, but normally remains disengaged so long as an overrunning condition exists. The mechanism includes a unique direction-responsive blocking construction for preventing undesirable engagement should an excessive overrunning condition be encountered.

SUMMARY OF THE INVENTION

This invention is directed in brief to an improved four-wheel drive transfer case of the type having an overrunning device therein, and is intended for use between a prime mover and a pair of drive axles. The mechanism includes a transfer case adaptable for transferring torque from an input to one output directly and to another output through a double-acting overrunning clutch. The clutch includes a cage which is frictionally biased in an improved manner to provide a drag effect thereon, thus tending to engage the clutch. The arrangement is such that the output connected with the front axle normally rotates faster than the output connected with the rear axle. In this condition, the clutch tends to freewheel and no power is transmitted to the front axle. If the rear wheels lose traction in either direction of rotation, the rear output shaft will speed up until it rotates at the same speed as the front output shaft. The clutch then engages due to the frictional bias, and torque is transferred to the front output to drive the front axle as well as the rear axle. When traction is restored to the rear wheels, the clutch disengages and the system reverts back to a conventional two-wheel drive condition.

The front output includes an outer clutch race of cylindrical configuration. An element defines an inner clutch race having a plurality of ramp surfaces, each associated with a roller carried by a roller cage. Frictional bias for the roller cage is provided by a drag ring which rotates with the roller cage and is itself adapted for frictional engagement with the case housing.

Excessive overspeed of the normally overrunning clutch race may pull the rollers across the ramp surfaces, resulting in an undesirable locking condition. To guard against such undesirable clutch engagement, a direction-sensitive blocking device prevents roller movement through the freewheel position, and does so independently of operating speed. The device includes a mechanism rotatable with the clutch race which normally does not overrun. The mechanism is frictionally biased by a drag ring rotatable therewith and adapted for frictional engagement with the case housing. Upon initial movement of the clutch, a drag force is developed which causes an element of the mechanism to pivot into the path of movement of the roller cage. This prevents undesirable movement of the cage and its associated rollers across the central or freewheel position. The mechanism is direction-responsive, and operates in either direction of rotation, but without regard to the speed of rotation. The mechanism thus is not dependent on the development of centrifugal force.

Thus the requirements of various vehicle manufacturers for improved automatic four-wheel drive power trains may be satisfied with a simplified and economical assembly, as will be described.

BRIEF DESCRIPTION OF THE DRAWINGS

The objects and advantages of this invention will become apparent to those skilled in the art upon careful consideration of the specification herein, including the drawings, wherein:

FIG. 6 is an enlarged view of a portion of FIG. 1, similar to FIG. 3, showing details of the biasing mechanism and a modified form of the blocking device;

FIG. 7 is an enlarged sectional view taken along the line 7—7 of FIG. 6 showing additional details of the modified form of the blocking device; and FIG. 8 is a schematic view of the four-wheel drive vehicle.

Figure 1:
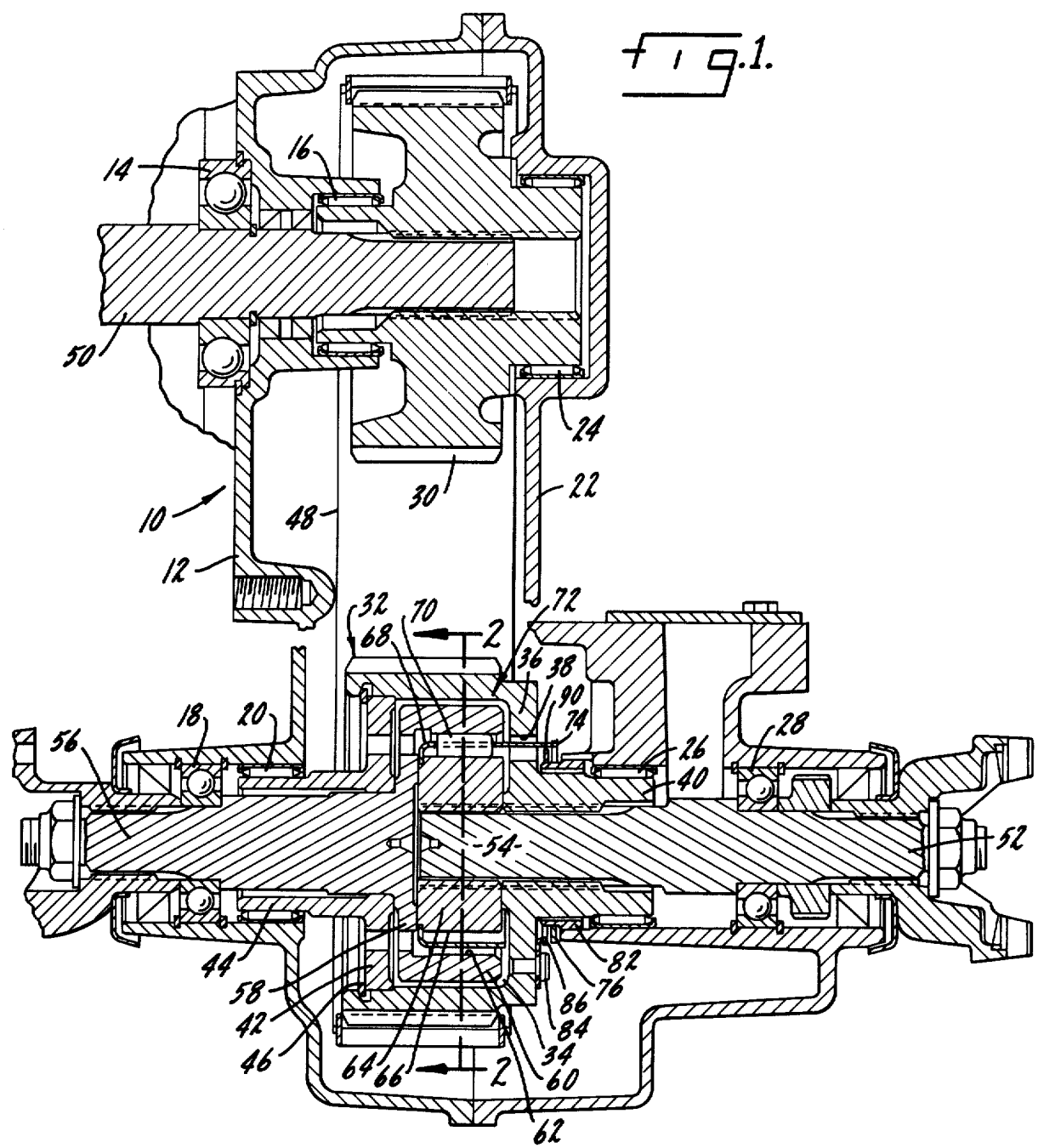
FIG. 1 is a sectional view showing the torque transfer case.

While this invention is susceptible of embodiment in many different forms, there is shown in the drawings and will herein be described in detail a preferred embodiment with the understanding that the present disclosure is to be considered as an exemplification of the principles of the invention and is not intended to limit the invention to this embodiment.

DESCRIPTION OF THE PREFERRED EMBODIMENT

Referring now to the drawings in greater detail, there is shown generally in FIG. 8 a multiple path drive system in the form of a four-wheel drive vehicle 1 having a prime mover 2 in driving relationship with a suitable transmission 3. A propeller shaft 4 is in driving engagement with a fixed axle assembly 5, which in turn supports a pair of ground-engaging wheels 6. Another propeller shaft 7 is in driving engagement with a steerable axle assembly 8, which in turn supports a pair of ground-engaging wheels 9. A transfer case 10 is in engagement with transmission 3 for receiving torque from prime mover 2, and is in engagement with propeller shafts 4 and 7 respectively for transmitting torque to ground-engaging wheels 6 and 9.

Figure 3:
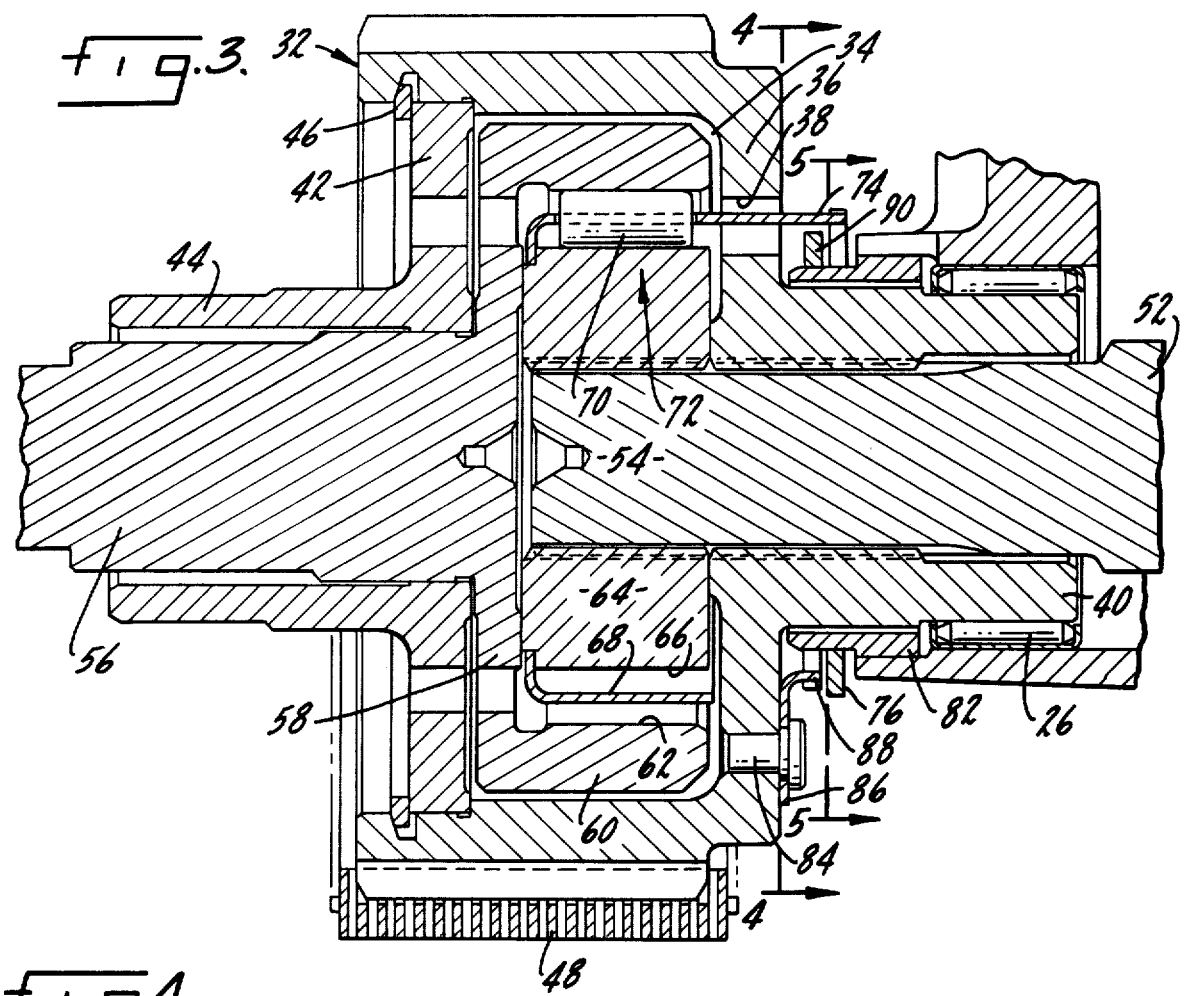
FIG. 3 is an enlarged view of a portion of FIG. 1 showing details of the biasing mechanism and blocking device.

Referring now to FIGS. 1 and 3, torque transfer case 10 includes a first housing section 12 which supports bearings 14, 16, 18 and 20. Torque transfer case 10 also includes a second housing section 22 suitably secured to housing section 12. Bearings 24, 26 and 28 are supported by housing section 22.

A first sprocket 30 is journalled in bearings 16 and 24. A second sprocket 32 defines an interior pocket 34 and includes a flange 36 which in turn defines a plurality of openings 38 extending therethrough and spaced around its periphery to communicate pocket 34 with the exterior thereof. Sprocket 32 also includes an annular extension 40 extending outwardly from flange 36. Also forming a portion of sprocket 32 is a flange 42 having an annular extension 44 extending outwardly therefrom. Flange 42 is secured to sprocket 32 by means of a locking ring 46 or the like. Sprocket assembly 32 is journalled in bearings 20 and 26. A suitable chain 48 couples sprockets 30 and 32. Sprocket 30, chain 48 and sprocket 32 form a chain drive train.

An input shaft 50 is journalled in bearing 14 and extends into transfer case 10. Input shaft 50 is splined to sprocket 30, and is adapted to receive torque, for example, from an associated transmission 3 of an automotive vehicle 1. It should be understood that input shaft 50 may be the output shaft of such a transmission.

A rear output shaft 52, in engagement with propeller shaft 4, is journalled in bearing 28 and extends into transfer case 10. Output shaft 52 is splined to extension 40 of sprocket 32 and defines an end portion 54 of reduced diameter.

A front output shaft 56 is journalled in bearing 18 and is in engagement with propeller shaft 7. Output shaft 56 extends into transfer case 10 and defines an upstanding flange 58 and an annular extension 60 within pocket 34 of sprocket 32. Extension 60 defines an outer clutch race 62 of cylindrical configuration.

An annular element or cam 64 is splined to end portion 54 of output shaft 52. Cam 64 is within pocket 34 and defines an inner clutch race 66 comprising a plurality of flats or ramp surfaces.

An annular cage 68 supports a plurality of wedging elements 70, one of which is associated with each flat of inner race 66. Extension 60, cam 64, races 62 and 66, cage 68 and wedging elements 70 comprise together a double-acting overrunning clutch 72. In one preferred form of the invention, wedging elements 70 are rollers, and clutch 72 is a roller clutch.

Figure 5:
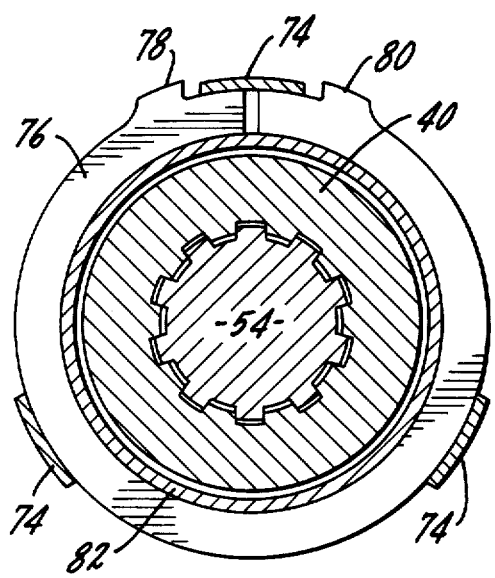
FIG. 5 is an enlarged sectional view taken along the line 5—5 of FIG. 3 showing additional details of the biasing mechanism.

As best shown in FIGS. 3 and 5, roller cage 68 defines a plurality of fingers 74 extending through openings 38 of sprocket 32. Fingers 74 are in frictional contact with a drag ring 76. Drag ring 76 defines a pair of spaced projections 78 and 80 for engagement by a finger 74 such that drag ring 76 is rotated with fingers 74 as roller cage 68 rotates. A wear ring 82 is press fit to housing section 22 for frictional contact by drag ring 76, so as to establish smooth frictional engagement with housing section 22. As a result, balanced radial forces are developed which cause a relative drag effect on roller cage 68.

Figure 4:
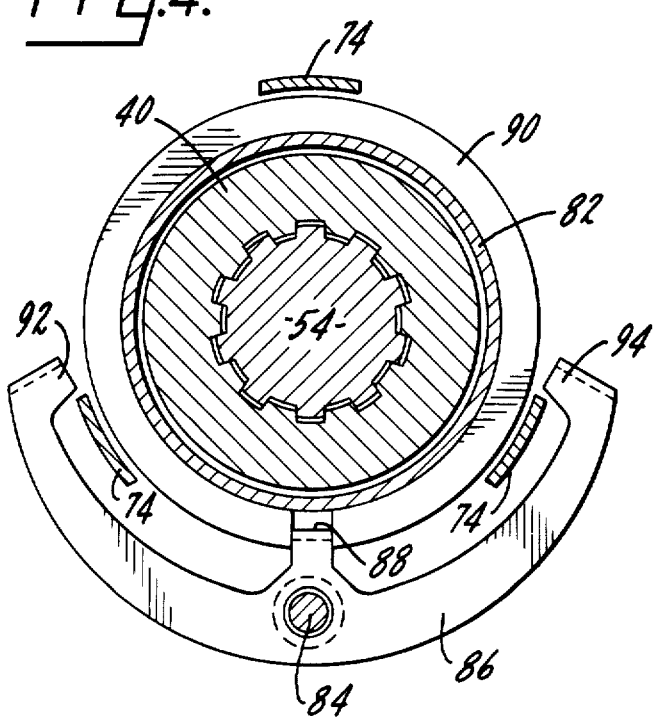
FIG. 4 is an enlarged sectional view taken along the line 4—4 of FIG. 3 showing additional details of the blocking device.

Turning now to FIGS. 3 and 4, the direction-responsive blocking mechanism includes a pin 84 secured to flange 36 of sprocket 32, and an arm 86 pivotally supported by pin 84. Arm 86 defines a projection 88 in engagement with a drag ring 90. Drag ring 90 is in frictional contact with wear ring 82, so as to establish smooth frictional engagement with housing section 22. However, drag ring 90 is spaced from fingers 74 of roller cage 68. Arm 86 also defines a pair of inwardly extending bosses 92 and 94.

Operation of transfer case 10 is as follows. Torque is received by input shaft 50 and is transferred through the chain drive train to drive output shaft 52. In one preferred form of the invention, output shaft 52 may be connected to rear drive axle assembly 5 of vehicle 1. Output shaft 56 may be connected to front drive axle assembly of the vehicle 1.

Output shaft 56 normally rotates faster than output shaft 52. This is inherent when the vehicle is turning, since the front wheels travel through a larger radius than do the rear wheels. For straight-ahead movement, this may be accomplished by providing front and rear axles having slightly different gear ratios, front wheels slightly smaller than rear wheels, or by inflating the front tires to a pressure slightly less than that in the rear tires. Other suitable means may be provided for causing output shaft 56 normally to overrun output shaft 52.

Annular extension 60 rotates with output shaft 56. Cam 64, splined to output shaft 52, rotates therewith. Thus, outer race 62 overruns inner race 66 under normal conditions. Roller cage 68 is rotated, and fingers 74 carry drag ring 76. Due to the frictional engagement of drag ring 76 with housing section 22, balanced radial forces are developed which result in a relative drag effect on roller cage 68. This relative drag effect is developed without any axial forces acting on roller cage 68, and thus there is no tendency for roller cage 68 to bind.

Figure 2:
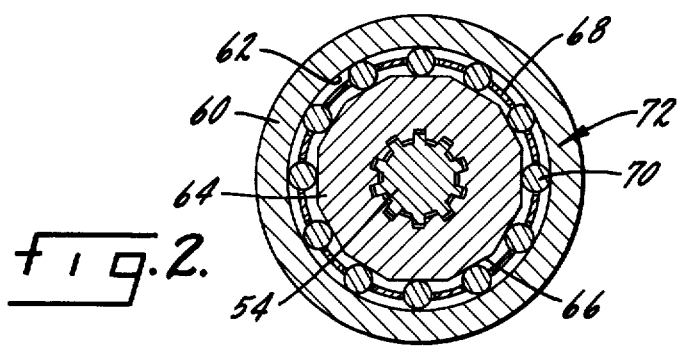
FIG. 2 is a sectional view taken along the line 2—2 of FIG. 1 showing details of the double-acting overrunning clutch.

With reference to FIG. 2, assume output shaft 52 and cam 64 are rotating in the clockwise direction. Output shaft 56 and extension 60 also are rotating in the clockwise direction, but at a slightly faster speed. The drag effect on roller cage 68 causes rollers 70, in effect, to rotate relatively in the counterclockwise direction. Rollers 70 tend to wedge between inner race 66 and outer race 62 so as to engage clutch 72. However, due to the fact that extension 60 is rotating faster than cam 64, a force is developed which acts on rollers 70 such that they will be carried in the clockwise direction, relatively, away from their engaged position. Thus, the relative rotation between extension 60 and cam 64 prevents engagement of clutch 72. As a result, torque is transferred to output shaft 52 but not to output shaft 56. In this condition, the operation is essentially that of a conventional two-wheel drive vehicle.

If the rear wheels lose traction, output shaft 52 will speed up until it is rotating at the same speed as is output shaft 56. The drag effect on roller cage 68 will cause rollers 70 to wedge between inner race 66 and outer race 62 when output shafts 52 and 56 are rotating at the same speed. When this takes place, torque will be transferred both to output shaft 52 and through clutch 72 to output shaft 56. In this condition, the operation is essentially that of a conventional four-wheel drive vehicle in locked-up mode.

When the rear wheels regain traction, output shaft 52 will slow down, and output shaft 56 will again overrun output shaft 52. Rollers 70 will be carried away from their engaged position toward a freewheeling position, thereby disengaging clutch 72 and restoring the vehicle to the two-wheel drive condition. Thus, it will be seen that the transfer case provides for establishment of four-wheel drive automatically as required, and for establishment of two-wheel drive automatically when four-wheel drive is not required. This automatic engaging and disengaging feature is provided when the vehicle is moving in either the forward or reverse directions, that is, when output shafts 52 and 56 are rotating in either the clockwise or counterclockwise directions as shown in FIG. 2.

As noted, relative rotation between extension 60 and cam 64, with extension 60 overspeeding, normally prevents clutch 72 from engaging by causing rollers 70 to move slightly, relatively, away from a wedging position on clutch races 62 and 66. This results in slight rotational displacement of cage 68 toward the central or freewheel position.

It has been determined that excessive overspeed of overrunning race 62 could pull cage 68 and rollers 70 beyond the central position into a clutch-engaging position on the opposite side of cam 64. This may occur under unusual operating conditions. For example, a tire blowout would cause the rolling radius of that wheel to become suddenly reduced. Such changes in the characteristics of a vehicle driveline would create a potentially dangerous condition. Similarly, shocks due to jerks, bumps, etc. could cause instantaneous excessive overspeed of the overrunning race sufficient to pull the rollers beyond the freewheel position to create the same potential danger.

This condition is sensitive not only to the percentage overrun of the outer race, but also to the gross vehicle speed. Centrifugal force effects on the rollers tend to drag them, and the cage, toward lock-up on the opposite side of the cam. While enough frictional drag on the cage to prevent this could be built into the system, the amount of drag required would be wasteful of power and could lead to excessive wear under normal operating conditions.

The aforementioned U.S. Pat. application Ser. No. 615,001 discloses a speed-responsive blocking mechanism which is actuated by centrifugal force to prevent inadvertent movement of rollers 70 across cam 64. However, at relatively low speeds the centrifugal force developed may be insufficient to actuate that speed-responsive mechanism.

As best shown in FIGS. 3 and 4, our direction-sensitive blocking mechanism is operable independently of speed. Initial vehicle movement is forward, for example, causes rotation of sprocket 32 to drive output shaft 52 and cam 64. Pin 84, secured to flange 36 of sprocket 32, rotates therewith and with cam 64. Arm 86 is carried with pin 84. Drag ring 90, engaged by projection 88 of arm 86, tends to lag pin 84 due to its frictional contact with wear ring 82. As a result, arm 86 is pivoted about pin 84. One of bosses 92 or 94 is moved farther into the path of rotational displacement of fingers 74, and the other boss is moved out of its path.

As noted above, upon clockwise rotation of sprocket 32, output shaft 52 and cam 64, fingers 74 and cage 68 in effect rotate relatively in the counterclockwise direction, thus moving rollers 70 toward a clutch-engaging position. Pin 84 rotates clockwise with sprocket 32, causing arm 86 to pivot clockwise about pin 84 to its limit of travel such that boss 92 is in the path of rotation of fingers 74, but boss 94 is not. Fingers 74 have limited freedom of movement such that cage 68 and rollers 70 are movable between clutch engaging and disengaging positions but are not movable beyond the freewheel position toward the opposite clutch engaging position.

It is also contemplated that when clutch 72 is in the central or freewheel position, bosses 92 and 94 could be constructed so as not to extend into the path of rotation of fingers 74. In this case, one of bosses 92 or 94 would pivot into its path upon pivotal movement of arm 86, while the other boss would pivot farther out of its path.

It should be understood that initial vehicle movement in reverse would result in a similar operation in the opposite direction of rotation.

A modified form of our direction-sensitive blocking mechanism is shown in FIGS. 6 and 7. An arm 86a is pivotally supported by pin 84. Arm 86a defines a projection 88a in engagement with drag ring 90, and also defines a pair of elements 92a and 94a. Initial vehicle movement is forward, for example, causes rotation of sprocket 32 to drive output shaft 52 and cam 64. Pin 84, secured to flange 36 of sprocket 32, rotates therewith and with cam 64. Arm 86a is carried with pin 84. Drag ring 90, engaged by projection 88a of arm 86a, tends to lag pin 84 due to its frictional contact with wear ring 82. As a result, arm 86a is pivoted about pin 84. One of elements 92a or 94a is moved into position to block undesirable relative rotational displacement of fingers 74, and thus rollers 70, beyond the central or freewheel position, to the opposite clutch engaging position.

Thus, it will be seen that operation of the mechanism shown in FIGS. 6 and 7 is the same as that of the mechanism shown in FIGS. 3 and 4.

The simplicity of this mechanism is apparent. It will be seen that a transfer case has been provided which normally drives one output shaft to provide conventional two-wheel drive of an associated vehicle. When required, a double-acting overrunning clutch engages automatically to provide drive to both output shafts so as to establish four-wheel drive. When four-wheel drive is no longer required, the clutch automatically disengages and the system reverts to conventional two-wheel drive. The clutch includes a direction-sensitive blocking device which acts automatically to prevent undesirable clutch lock-up.

It is anticipated that high-speed low torque or low-speed high torque drives may be established when suitable reduction gearing is provided. Such gearing is disclosed in U.S. application Ser. No. 621,194 filed Oct. 9, 1975.

It should be understood that while a preferred embodiment of the invention has been shown and described, this is illustrative and may be modified by those skilled in the art without departing from the scope thereof, which is to be limited only by the claims herein.

We claim:

1. A torque transfer assembly comprising a housing, an input shaft supported for rotation in said housing, first and second output shafts supported for rotation in said housing, and means coupling said input shaft with said output shafts for transfer of torque thereto, said coupling means including an overrunning clutch having wedging means movable between two clutch engaging positions wherein torque is transferred to said second output shaft and a clutch disengaging position wherein torque is not transferred to said second output shaft, means biasing said wedging means toward one of said clutch engaging positions, and means operable upon initial rotation of one of said shafts for blocking said movement of said wedging means to the other of said clutch engaging positions.

2. The invention of claim 1, said blocking means being operative in response to initial rotation of one of said output shafts.

3. The invention of claim 2, said blocking means being operative in response to initial rotation of said first output shaft.

4. The invention of claim 3, said blocking means being movable into the path of said wedging means in response to said initial rotation of said first output shaft.

5. The invention of claim 4, said blocking means being movable independently of the speed of rotation of said first output shaft.

6. The invention of claim 1, said biasing means including means movable with said wedging means and in frictional contact with said housing for effecting said biasing of said wedging means.

7. The invention of claim 5, said blocking means including means in frictional contact with said housing for effecting said movement of said blocking means.

8. The invention of claim 6, said blocking means including means movable in response to said initial rotation of said one shaft and in frictional contact with said housing for effecting said blocking of said wedging means.

9. In a four-wheel drive vehicle having a transfer case for transferring rotary motion from a source of power to front and rear pairs of traction wheels; the combination wherein said transfer case comprises a housing, an input shaft and front and rear output shafts rotatably supported in said housing, and means in said housing for transferring rotary motion from said input shaft to said output shafts, said transferring means coupling said input shaft with one of said output shafts and including an overrunning clutch coupled with the other of said output shafts, said clutch having first and second elements rotatable in response to rotation of said output shafts and respectively defining first and second clutch races, a roller cage, a plurality of rollers carried by said cage between said clutch races for relative movement between two clutch engaging positions, means biasing said rollers toward one of said clutch engaging positions upon rotation of one of said elements, rotation of said second element faster than said first element tending relatively to move said rollers away from said one engaging position, and means responsive to rotation of one of said elements for preventing said relative movement of said rollers to the other of said clutch engaging positions, said preventing means being so responsive without regard to centrifugal force developed as said one element rotates.

10. The invention of claim 9, said preventing means being movable in the path of said cage in response to said rotation of said one element, whereby said rollers are blocked from said movement to said other clutch engaging position, said rollers being movable relatively between said one clutch engaging position and a clutch disengaging position when said preventing means is in the path of said cage.

11. The invention of claim 9, said rotation of said second element faster than said first element by a relatively small amount being sufficient to move said rollers away from said one clutch engaging position but insufficient to overcome said biasing means and move said rollers to said other clutch engaging position, said rotation of said second element faster, than said first element by a relatively large amount being sufficient to overcome said biasing means and move said rollers to said other clutch engaging position, said preventing means being responsive to rotation of said first element for preventing said relative movement of said rollers to said other clutch engaging position.

12. Power transmission apparatus comprising a housing, a first element supported for rotation in said housing and defining a plurality of cam surfaces, a second element supported for rotation in said housing and defining an annular surface, an annular cage, a plurality of rollers supported by said cage and subject to rotational displacement therewith relative to said elements between a central freewheel position and two positions in which said rollers are in wedging engagement with said surfaces, means responsive to rotation of at least one of said elements relative to said housing for biasing said cage into rotational displacement toward one of said engaging positions, and blocking means responsive to rotation of at least one of said elements for blocking rotational displacement of said cage to the other of said engaging positions, said blocking means being so responsive independently of the speed of rotation of said one element.

13. The invention of claim 12, said blocking means being movable into the path of rotational displacement of said cage upon said rotation of said one element, whereby said cage is blocked from rotational displacement to said other engaging position.

14. The invention of claim 12, said blocking means including an arm pivotally supported by and rotatable with said one element, said arm being pivotal in the path of rotational displacement of said cage upon said rotation of said one element.

15. The invention of claim 14, said blocking means including means responsive to said rotation of said one element for effecting said pivoting of said arm.

16. The invention of claim 15, said blocking means including means responsive to friction developed upon said rotation of said one element for effecting said pivoting of said arm.

17. Power transmission apparatus comprising a housing, first and second elements supported for rotation in said housing, wedging means subject to displacement relative to said elements between two positions in wedging engagement therewith, means biasing said wedging means toward one of said engaging positions, and blocking means responsive to rotation of one of said elements for blocking said displacement of said wedging means to the other of said engaging positions, said blocking means including an arm pivotally supported by said one element, and means in frictional contact with said housing for pivoting said arm to effect said blocking in response to said rotation of said one element relative to said housing.

18. The invention of claim 17, said arm blocking said displacement of said wedging means to said two positions when said wedging means is between said two positions.

19. The invention of claim 17, said arm unblocking said displacement of said wedging means to said two positions when said wedging means is between said two positions.

20. The invention of claim 17, said biasing means including means in frictional contact with said housing for biasing said wedging means toward said one engaging position in response to rotation of said one element in one direction and toward said other engaging position in response to rotation of said one element in another direction, said blocking means being responsive to said rotation of said one element in said one direction for blocking said displacement of said wedging means to said other engaging position and responsive to said rotation of said one element in said other direction for blocking said displacement of said wedging means to said one engaging position.

* * * * *